C. D. BONSALL

May 28, 1929. LOAD LIFTING ARRANGEMENT Re. 17,302

Original Filed Nov. 12, 1926

Inventor
Charles D. Bonsall
Linton E. Sisson
Attorney

Reissued May 28, 1929. Re. 17,302

UNITED STATES PATENT OFFICE.

CHARLES DAVID BONSALL, OF NEW KENSINGTON, PENNSYLVANIA.

LOAD-LIFTING ARRANGEMENT.

Original No. 1,702,961, dated February 19, 1929, Serial No. 147,990, filed November 12, 1926. Application for reissue filed March 28, 1929. Serial No. 350,770.

The device relates to railway freight cars and comprises means forming a part of the roof structure which provides places for attaching load lifting devices, such load lifting devices being used to move heavy articles into and out of the car or move such articles within the car or to place one part of the load over another part, such as double decking automobiles.

An object of the invention is to provide a longitudinally extending beam which performs the usual functions of a ridge pole (or purlin) of a railway box car by bracing the roof against distortion and supporting the roofing (usually metallic plates) which beam, by its peculiar and particular configuration, and its relation to other parts of the roof structure facilitates the attachment of the load lifting means, which means may be attached by the use of a hook, ice tongs or by throwing a chain over a part of my device.

Another object of the invention is to attach a longitudinally extending load lifting beam to an inverted U-shaped carline to provide a place for attaching a load lifting device.

Figure 1:
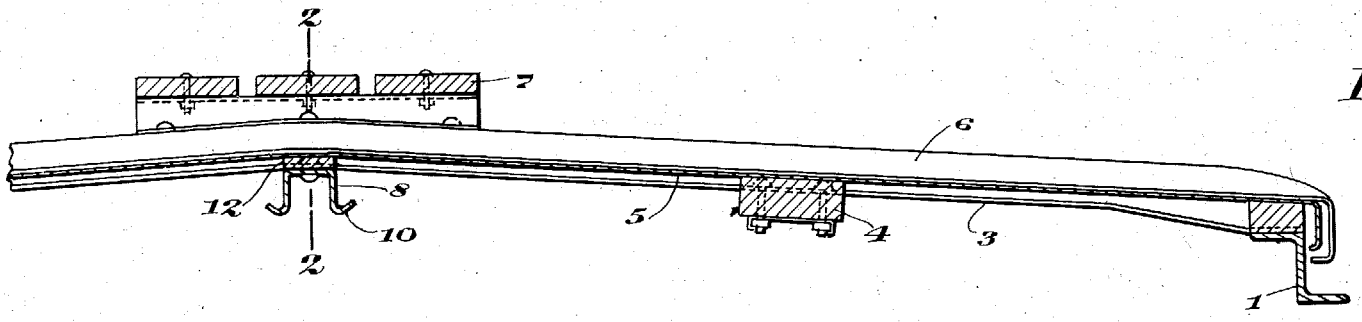
Fig. 1 shows a lateral cross section of part of a railway box car with my device applied thereon.
Figure 2:
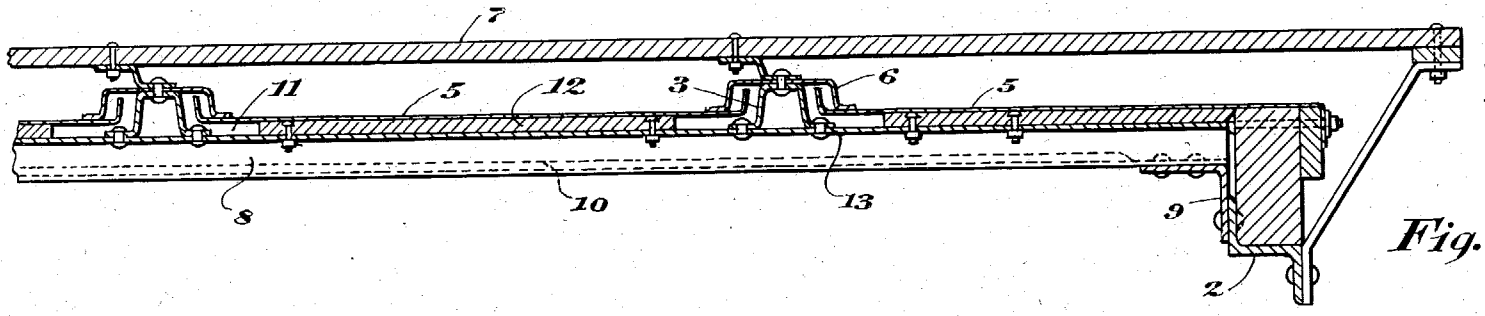
Fig. 2 shows a longitudinal cross section of part of a railway car with my device applied thereon.
Figure 3:
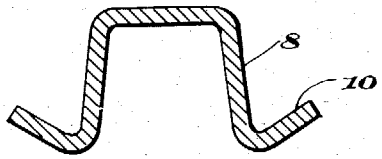
Fig. 3 is a section of my longitudinally extending load lifting beam.

The usual parts of the car are shown, wherein 1 is the side plate; 2 the end plate; 3 the carlines; 4 the purlin; 5 the roof sheet; 6 the transverse cap and 7 the running boards. The carlines 3 span the distance between the opposite side plates 1 and are attached thereto in any convenient manner, and the purlins 4 extend longitudinally of the car and are attached to the carlines 3 so as to brace the roof structure and also support the metallic roof sheets 5. In ordinary construction the roof sheets or other roofing rest upon the side plate, purlins and ridge pole.

My device comprises a longitudinally extending load lifting beam 8, preferably positioned adjacent the longitudinal center of the car and secured to the bottom parts of the carlines. This beam preferably extends the entire length of the car and has its opposite ends secured to the plates 2 by brackets 9 or any other convenient means. This load lifting beam is of inverted U-shaped section with an outwardly projecting flange 10 at each of its lower edges, which flanges are preferably inclined upwardly and may be used to support hooks or ice tongs. By extending the beam the full length of the car its range of operation is increased and it may be used to support a plurality of load lifting devices if desired.

The roof sheets or other roofing 5 is positioned in a plane above the beam so as to provide a space 11 therebetween through which the chain or rope of a load lifting device may be inserted. I provide fillers 12 on the top of the beam 8 which support the roofing upon the beam and hold the roof sheets in contact with the transverse caps but these fillers only extend part of the distance between the adjacent carlines so as to leave open spaces 11 between the roofing and the beam to accommodate the ropes or chains of a load lifting device mentioned before.

The load lifting beam and the fillers combine to perform the usual functions of the ridge pole of a car, as the beam ties the carlines together, thus bracing the roof structure, and the filler supports the roofing adjacent the center of the car.

In the preferred form the carlines are of inverted U-section with outstanding flanges 13 at their lower edges to which the load lifting beam is secured. With this arrangement the chain or rope of a lifting device may be inserted above the load lifting beam and between the spaced apart walls of the carlines forming the inverted U-section.

The peculiar formation of the load lifting beam is disclosed but not claimed in my Patent No. 1,645,217, October 11, 1927.

The accompanying drawings illustrate the preferred form of the invention, though it is to be understood that the invention is not limited to the exact details of construction shown and described, as it is obvious that various modifications thereof within the scope of the claims will occur to persons skilled in the art.

I claim:

1. In a railway car, the combination of a plurality of inverted U carlines, with outstanding flanges at their lower edges, and a beam extending normal thereto secured to said flanges, said beam being of inverted U section with upwardly and outwardly extending flanges at its lower edges.

2. In a railway car having side plates, the combination of a plurality of carlines with their opposite ends attached to the opposite side plates, a longitudinally extending beam secured to the carlines, said beam being of inverted U section with upwardly and outwardly extending flanges at its lower edges, and roofing positioned in a plane above said beam and spaced therefrom.

3. In a railway car having side plates, the combination of a plurality of carlines with their opposite ends attached to the opposite side plates, a longitudinally extending beam secured to the carlines, said beam being of inverted U section with upwardly and outwardly extending flanges at its lower edges, roofing positioned in a plane above said beam, and fillers supporting said roofing upon said beam, said fillers extending only part of the distance between carlines so as to leave open spaces between said roofing and said beam.

4. In a railway car having side plates and end plates; the combination of a plurality of carlines with their opposite ends attached to the opposite side plates, a longitudinally extending beam secured to the carlines and end plates, said beam being of inverted U-section with upwardly and outwardly extending flanges at its lower edges, roofing positioned in a plane above said beam, and fillers supporting said roofing upon said beam, said fillers extending only part of the distance between carlines so as to leave open spaces between said roofing and said beam.

5. The combination of a longitudinally extending load lifting beam with the other elements of a railway car, said beam being of inverted U-section with an upwardly and outwardly inclined flange at each lower margin thereof.

6. In a railway car, the combination of an inverted U carline with a lateral flange at each lower margin, and a beam extending normal thereto secured to each of said flanges, said beam being of inverted U-section with an upwardly and outwardly inclined flange at each lower margin.

7. In a railway car, the combination of a plurality of inverted U carlines, with outstanding flanges at their lower edges, and a beam extending normal thereto secured to said flanges, said beam being of inverted U section with outwardly extending flanges at its lower edges.

8. In a railway car having side plates, the combination of a plurality of carlines with their opposite ends attached to the opposite side plates, a longitudinally extending beam secured to the carlines, said beam being of inverted U section with outwardly extending flanges at its lower edges, and roofing positioned in a plane above said beam and spaced therefrom.

9. In a railway car having side plates, the combination of a plurality of carlines with their opposite ends attached to the opposite side plates, a longitudinally extending beam secured to the carlines, said beam being of inverted U section with outwardly extending flanges at its lower edges, roofing positioned in a plane above said beam, and fillers supporting said roofing upon said beam, said fillers extending only part of the distance between carlines so as to leave open spaces between said roofing and said beam.

10. In a railway car having side plates and end plates; the combination of a plurality of carlines with their opposite ends attached to the opposite side plates, a longitudinally extending beam secured to the carlines and end plates, said beam being of inverted U-section with outwardly extending flanges at its lower edges, roofing positioned in a plane above said beam, and fillers supporting said roofing upon said beam, said fillers extending only part of the distance between carlines so as to leave open spaces between said roofing and said beam.

11. The combination of a longitudinally extending load lifting beam with the other elements of a railway car, said beam being of inverted U-section with an outwardly extending flange at each lower margin.

12. In a railway car, the combination of an inverted U carline with a lateral flange at each lower margin, and a beam extending normal thereto secured to each of said flanges, said beam being of inverted U-section with an outwardly extending flange at each lower margin.

13. In a railway car having a plurality of carlines, load sustaining roof sheets interposed between adjacent carlines, a longitudinal beam secured to said carlines spaced below said roof sheets, and a filler positioned upon said beam adapted to transmit the roof load to said beam.

14. In a railway car having a plurality of carlines, load sustaining roof sheets interposed between adjacent carlines, transverse caps supported by said carlines and having outstanding flanges contacting with adjacent roof sheets, a longitudinal beam secured to said carlines spaced below said roof sheets, and a filler positioned upon said beam adapted to transmit the roof load to said beam and to hold the roof sheets in contact with the transverse caps.

15. In a railway car having a plurality of carlines, load sustaining roof sheets interposed between adjacent carlines, a longitudinal beam secured to said carlines spaced below said roof sheets, and a filler positioned upon said beam adapted to transmit the roof load to said beam, said fillers extending only part of the distance between the carlines so as to leave open spaces between said roof sheets and said beam.

16. In a railway car having a plurality of carlines, load sustaining roof sheets interposed between adjacent carlines, transverse caps supported by said carlines and having outstanding flanges contacting with adjacent roof sheets, a longitudinal beam secured to said carlines spaced below said roof sheets, and a filler positioned upon said beam adapted to transmit the roof load to said beam and to hold the roof sheets in contact with the transverse caps, said fillers extending only part of the distance between the carlines so as to leave open spaces between said roof sheets and said beam.

CHARLES DAVID BONSALL.